(12) United States Patent
Sheriff

(10) Patent No.: US 9,585,184 B1
(45) Date of Patent: Feb. 28, 2017

(54) USING MULTIPLE WIRELESS CONNECTIONS

(71) Applicant: Google Inc., Mountain View, CA (US)

(72) Inventor: Irfan Sheriff, Fremont, CA (US)

(73) Assignee: Google Inc., Mountain View, CA (US)

( * ) Notice: Subject to any disclaimer, the term of this patent is extended or adjusted under 35 U.S.C. 154(b) by 261 days.

(21) Appl. No.: 13/831,478

(22) Filed: Mar. 14, 2013

Related U.S. Application Data

(60) Provisional application No. 61/719,919, filed on Oct. 29, 2012.

(51) Int. Cl.
  *H04W 76/02* (2009.01)
  *H04W 36/14* (2009.01)
(52) U.S. Cl.
  CPC .................... *H04W 76/025* (2013.01)
(58) Field of Classification Search
  None
  See application file for complete search history.

(56) References Cited

U.S. PATENT DOCUMENTS

| | | | |
|---|---|---|---|
| 7,426,178 B2 | 9/2008 | Guo et al. | |
| 8,005,988 B2 | 8/2011 | Maes | |
| 2005/0288058 A1* | 12/2005 | Chandhok | H04M 1/04 455/556.1 |
| 2008/0259871 A1 | 10/2008 | Baek et al. | |
| 2012/0023189 A1* | 1/2012 | Giaretta et al. | 709/217 |
| 2012/0294200 A1* | 11/2012 | Wang | H04W 76/02 370/277 |
| 2013/0039353 A1* | 2/2013 | Franco et al. | 370/338 |
| 2015/0016417 A1* | 1/2015 | Dees et al. | 370/331 |

OTHER PUBLICATIONS

'Intel® Wireless Networking' [online] "Intel® Wireless Display, Issue using Intel® Wireless Display with WiMAX," 2011, [retrieved on Oct. 29, 2012]. Retrieved from the Internet: URL:<www.intel.com/support/wireless/wtech/iwd/sb/CS-031661.htm> 1 page.
'Android Authority' [online] "WiFi Dsplay to Make Your Life Easier in 2012," 2012, [retrieved on Oct. 27, 2012]. Retrieved from the Internet: URL:< www.androidauthority.com/wifi-display-to-make-your-life-easier-in-2012-47153/> 7 pages.

(Continued)

*Primary Examiner* — Awet Haile
(74) *Attorney, Agent, or Firm* — Fish & Richardson P.C.

(57) ABSTRACT

In one implementation, a computer-implemented method includes receiving, at a computing device and while the computing device is using a first wireless connection, a request to establish a second wireless connection using a same wireless radio standard as the first wireless connection; detecting whether the computing device is able to operate more than one wireless connection simultaneously using the wireless radio standard; based on the detecting, determining whether to terminate the first wireless connection and to establish the second wireless connection; based on the determining, terminating the first wireless connection and establishing the second wireless connection; detecting that the computing device has finished using the second wireless connection; and, in response to detecting that the computing device has finished using the second wireless connection, automatically terminating the second wireless connection and re-establishing the first wireless connection.

20 Claims, 10 Drawing Sheets

(56) References Cited

OTHER PUBLICATIONS

'Android and Me' [online] "First Android devices with WiFI Display will be powered by Qualcomm's Snapdragon," 2012, [retrieved on 2012. Retrieved from the Internet: URL:< http://androidandme.com/2012/01/news/first-android-devices-with-wi-fi-dispiay-will-be-powered-by-qualcomms-snapdragon/#comments> 13 pages.

Alkhawlani, Mohammed M. "Multi-Criteria Vertical Handover for Heterogonous Networks," International Journal of Wireless & Mobile Networks (IJWMN), vol. 3, No. 2, Apr. 2011, 15 pages.

Chen, Beizhong et al., "Fast Handover for Multiple-Interface Mobile Devices Connecting to a Single Foreign Agent in MIPv4 with MIH Support," IEEE ICC 2009, 5 pages.

Nguyen, Thinh P.Q., "Path Diversity Media Streaming over Best Effort Packet Networks," a dissertation submitted in partial satisfaction of the requirements for the degree of Doctor of Philosophy in Engineering—Electrical Engineering and Computer Sciences in the Graduate Division of the University of California at Berkeley, 2000, 185 pages.

Pan, Yi et al., "An End-to-End Multi-Path Smooth Handoff Scheme for Stream Media," WMASH '03, Sep. 19, 2003, 12 pages.

ParandehGheibi, Ali et al., "Access-Network Association Policies for Media Streaming in Heterogeneous Environments," submitted to CDC Apr. 20, 2010, 8 pages.

Tüysüz, Ayşegül et al., "Handovers in Wireless Overlay Networks Based on Mobile IPV6," Conference on Academic Information '05 (Akademik Biliş im 2005), Gaziantep, Turkey, 2005, 10 pages.

\* cited by examiner

USING MULTIPLE WIRELESS CONNECTIONS

CROSS-REFERENCE TO RELATED APPLICATIONS

This application claims the benefit of priority under 35 U.S.C. §119(e) to U.S. Provisional Application Ser. No. 61/719,919, filed on Oct. 29, 2012. The entire contents of which is incorporated herein by reference.

TECHNICAL FIELD

This document relates to mechanisms for using multiple wireless connections by a computing device.

BACKGROUND

Computing devices, such as smartphones, tablet computing devices, laptop computers, and desktop computers, have included a variety of different wireless chipsets to enable wireless communication using various wireless radio standard. For example, Wi-Fi chipsets have been included in computing devices to permit establishment of and communication using Wi-Fi connections with Wi-Fi access points using the IEEE 802.11 wireless radio standard. Such Wi-Fi connections can be established over a plurality of different channels. Other wireless chipsets have been included in computing devices to enable wireless communication, such as near field communication (NFC) chipsets and mobile data chipsets for cellular networks, such as 3G chipsets and 4G chipsets.

SUMMARY

This document discusses computer systems, devices, and techniques for using multiple wireless connections by a computing device. In particular, when a computing device has been requested to simultaneously establish and use more than one wireless connection with the same wireless radio standard and/or wireless chipset, any of a variety of appropriate techniques as discussed in this document can be performed allow the computing device for the use of the multiple wireless connections.

For example, if such a computing device is already using a first wireless connection (e.g., a Wi-Fi connection) when a request to establish a second wireless connection (e.g., a Wi-Fi Display connection, a Wi-Fi Direct connection) is received, the computing device can attempt to negotiate the second wireless connection to use the same channel as the first wireless connection. If successful, the computing device can proceed to operate the first wireless connection and the second wireless connection using the common channel.

If such a channel negotiation is unsuccessful (meaning there is a frequency conflict for the two wireless connections), the computing device can determine whether it is appropriate to terminate the first wireless connection (e.g., request consent from the user, determine whether the user has provided standing instructions to terminate the first wireless connection in favor of the second wireless connection, determine whether the user has instructed the computing device at least a threshold number of times to terminate the first wireless connection in favor of the second wireless connection) and, if appropriate, can terminate the first wireless connection and can establish the second wireless connection (e.g., terminate a Wi-Fi connection to establish a Wi-Fi Display connection). If the first wireless connection provided access to a portion of a network (e.g., the internet) to which the second wireless connection does not provide access (e.g., Wi-Fi connection provided local area network (LAN) and internet access, and Wi-Fi Display connection only provides access to one or more other computing devices), the computing device can attempt to establish another wireless connection that provides such access and that uses a different wireless radio standard and/or wireless chipset (e.g., mobile data connection such as a 3G wireless connection, a 4G LTE connection, 4G WiMAX connection).

Upon determination that the second wireless connection is no longer being used on the computing device (e.g., a data transfer session using a Wi-Fi Display connection has ended), the computing device can automatically terminate the second wireless connection (e.g., Wi-Fi Display connection), can re-establish the first wireless connection (e.g., Wi-Fi connection), and can terminate the other wireless connection that was established using a different wireless radio standard and/or wireless chipset (e.g., mobile data connection).

In one implementation, a computer-implemented method includes receiving, at a computing device and while the computing device is using a first wireless connection, a request to establish a second wireless connection using a same wireless radio standard as the first wireless connection; detecting whether the computing device is able to operate more than one wireless connection simultaneously using the wireless radio standard; based on the detecting, determining whether to terminate the first wireless connection and to establish the second wireless connection; based on the determining, terminating the first wireless connection and establishing the second wireless connection; detecting that the computing device has finished using the second wireless connection; and, in response to detecting that the computing device has finished using the second wireless connection, automatically terminating the second wireless connection and re-establishing the first wireless connection.

Such a computer-implemented method can optionally include one or more of the following features. The first wireless connection can be a Wi-Fi connection with a wireless access point; the second wireless connection can be a Wi-Fi direct connection with another computing device; and the wireless radio standard can be a IEEE 802.11 wireless radio standard. The Wi-Fi direct connection can be a Wi-Fi display connection with the other computing device, the Wi-Fi display connection automatically encoding and transmitting video and audio data from the computing device for presentation by the other computing device. The other computing device can be a television with one or more Wi-Fi chipsets that is configured to establish the Wi-Fi display connection.

The first wireless connection can provide access to a first network that is different from a second network to which the second wireless connection provides access. The computer-implemented method can also include, further based on the determining, establishing a third wireless connection to replace the first wireless connection, the third wireless connection can use a different wireless radio standard than the wireless radio standard of the first and second wireless connections, and the third wireless connection can provide access to at least a portion of the first network that is accessible through the first wireless connection; and, further in response to detecting that the computing device has finished using the second wireless connection, automatically terminating the third wireless connection. The first wireless connection can be a Wi-Fi connection with a wireless access point; the second wireless connection can be a Wi-Fi direct connection with another computing device; and the third wireless connection can be a mobile data connection through a cellular network. The cellular network can be a 3G cellular network, and the different wireless radio standard can be a 3G wireless standard. The cellular network can be a 4G cellular network, and the different wireless radio standard can be a 4G long term evolution (LTE) wireless standard or a 4G mobile WiMAX standard.

Detecting whether the computing device is able to operate more than one wireless connection can include requesting that the second wireless connection be established using the wireless radio standard while the computing device is using the first wireless connection; and receiving, in response to the requesting, a notification that the computing device is unable to operate more than one wireless connection simultaneously using the wireless radio standard. The computer-implemented method can further include, in response to receiving the notification, identifying a channel for the first wireless connection; and transmitting, by the computing device, a request to use the channel of the first wireless connection for the second wireless connection; receiving, at the computing device, a response indicating whether the second wireless connection will use the channel of the first wireless connection. The response can indicate that the second wireless connection will not use the channel of the first wireless connection, proceeding with the determining. When the response indicates that the second wireless connection will use the channel of the first wireless connection, the second wireless connection can be established using the channel and without terminating the first wireless connection.

The determining can include outputting, by the computing device, information that i) indicates that, to establish the second wireless connection, the first wireless connection will have to be terminated, and ii) requests user input indicating whether the user wants to terminate the first wireless connection to establish the second wireless connection; receiving, by the computing device, the user input; and determining, based on the user input, whether to terminate the first wireless connection and to establish the second wireless connection. The determining can include accessing, by the computing device, information that identifies previous behavior on the computing device with regard to establishing and terminating the first wireless connection and the second wireless; identifying, based on the accessed information, whether i) a user of the computing device previously set a rule for the computing device to automatically terminate the first wireless connection to establish the second wireless connection, or ii) the user of the computing device has previously instructed the computing device at least a threshold number of times to terminated the first wireless connection to establish the second wireless connection; and, based on the identifying, determining whether to terminate the first wireless connection and to establish the second wireless connection.

The request to establish the wireless connection can be received from an application that is running on the computing device; and detecting that the computing device has finished can include, after establishing the second wireless connection, providing a notification to the application that the second wireless connection has been established, wherein the application initiates a data transfer session using the second wireless connection; monitoring a status of the data transfer session for the application; detecting that the data transfer session has ended; and, in response to detecting that the data transfer session has ended, determining that the computing device has finished using the second wireless connection.

In another implementation, a computing device includes a computer processor; a wireless chipset to communicate with other computing devices using a wireless radio standard; a driver for the wireless chipset that is programmed to i) cause the wireless chipset to transmit and receive communication according to the wireless radio standard, and ii) provide indications as to whether the wireless chipset is able to operate more than one wireless connection simultaneously using the wireless radio standard; and a wireless connection manager that is programmed to i) determine whether to terminate a first wireless connection in response to receiving a request to establish a second wireless connection, the first wireless connection and the second wireless connection using the wireless chipset and the wireless radio standard, ii) terminate the first wireless connection and to establish the second wireless connection based on the determination, and iii) in response to detecting that the second wireless connection is finished being used, automatically terminating the second wireless connection and re-establishing the first wireless connection.

Such a computing device can optionally include one or more of the following features. The first wireless connection can be a Wi-Fi connection with a wireless access point; the second wireless connection can be a Wi-Fi direct connection with another computing device; and the wireless radio standard can be a IEEE 802.11 wireless radio standard. The Wi-Fi direct connection can be a Wi-Fi display connection with the other computing device, the Wi-Fi display connection automatically encoding and transmitting video and audio data from the computing device for presentation by the other computing device.

In another implementation, a computer program product stored on a computer-readable storage device including instructions that, when executed, cause one or more computer processors of a computing device to perform operations that include receiving, at the computing device and while the computing device is using a first wireless connection, a request to establish a second wireless connection using a same wireless radio standard as the first wireless connection; detecting whether the computing device is able to operate more than one wireless connection simultaneously using the wireless radio standard; based on the detecting, determining whether to terminate the first wireless connection and to establish the second wireless connection; based on the determining, terminating the first wireless connection and establishing the second wireless connection; detecting that the computing device has finished using the second wireless connection; and, in response to detecting that the computing device has finished using the second wireless connection, automatically terminating the second wireless connection and re-establishing the first wireless connection.

The techniques discussed here may, in certain implementations, provide one or more advantages. For example, certain implementations can allow a computing device to use multiple wireless connections that the computing device is otherwise not configured or capable of using. For instance, if a computing device is not configured to use more than one wireless connection under the 802.11 wireless standard for Wi-Fi connections, the computing device can be allowed to either establish the multiple wireless connections under the same Wi-Fi channel or can cancel one of the connections and supplement the network access provided by the canceled network with another wireless connection that uses a different wireless chipset and/or communication standard, such as a mobile data connection (e.g., 3G connection, 4G LTE connection, 4G WiMAX connection).

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document generally describes computing devices using multiple wireless connections, such as Wi-Fi wireless connections, NFC wireless connections, and/or mobile data connections (e.g., 3G data connections, 4G LTE data connections, 4G WiMax data connections).

For example, a computing device may have a Wi-Fi chipset and/or driver that do not permit more than one simultaneous Wi-Fi connection using the IEEE 802.11 wireless standard. To allow for use of multiple Wi-Fi connections, such as using a Wi-Fi connection (e.g., connection to a Wi-Fi access point) with a Wi-Fi Direct connection (peer-to-peer wireless connection between a plurality of computing devices using the 802.11 standard) or Wi-Fi Display connection (peer-to-peer wireless connection to transmit encoded audio and/or video data between computing devices), the computing device can attempt to negotiate for the multiple Wi-Fi connections to be on the same Wi-Fi channel. If channel negotiation is successful, the computing device can proceed to operate the multiple Wi-Fi connections (e.g., a Wi-Fi connection and a Wi-Fi Display connection) simultaneously using the agreed upon channel. If the channel negotiation is not successful, meaning that there is a frequency conflict for the multiple wireless connections, then the computing device can proceed to use one of the Wi-Fi connections (e.g., Wi-Fi Display connection), can terminate and/or not establish the other Wi-Fi connection(s) (e.g., Wi-Fi connection with Wi-Fi access point), and can establish one or more alternate wireless connections (e.g., mobile data connections such as 3G and/or 4G wireless connections) that use different wireless chipsets and/or wireless standards as substitutes for the other Wi-Fi connection(s). In such situations, when use of the active Wi-Fi connection has ended (e.g., a data session over the Wi-Fi Display connection has ended), the computing device can automatically terminate the active Wi-Fi connection (e.g., Wi-Fi Display connection), can re-establish the other Wi-Fi connection(s) (e.g., Wi-Fi connection with Wi-Fi access point), and can terminate the one or more alternate wireless connections (e.g., mobile data connections).

Using multiple Wi-Fi connections is an example of the techniques, computing devices, and systems disclosed in this document. Multiple wireless connections can also be used across other wireless technologies and/or standards, such as wireless communication over NFC, BLUETOOTH, and/or mobile data connections (e.g., 3G data connections, 4G LTE data connections, 4G WiMax data connections).

Figure 1A:
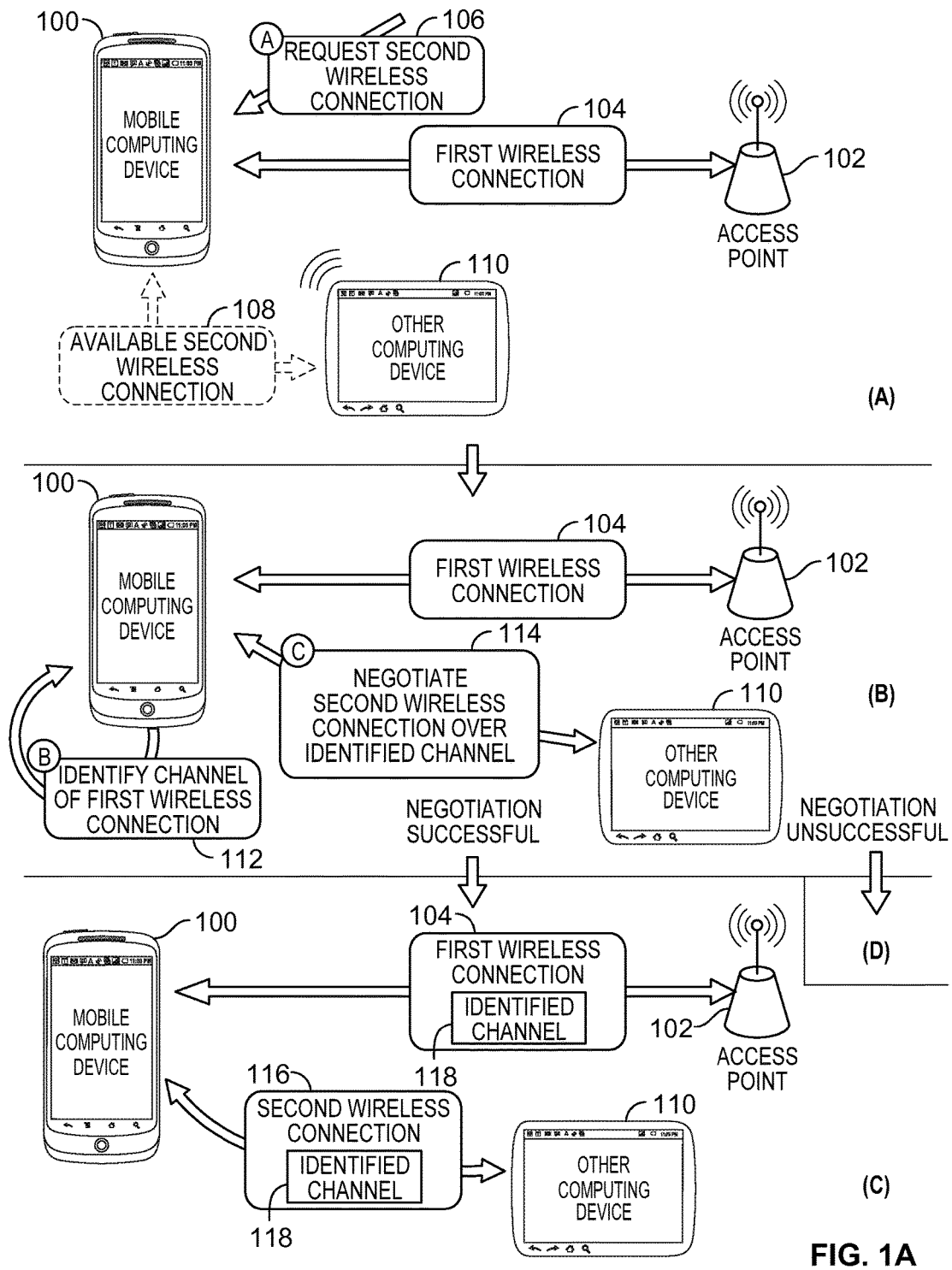
FIGS. 1A-C are conceptual diagrams of a mobile computing device that determines whether and how to use multiple wireless connections.
Figure 1B:
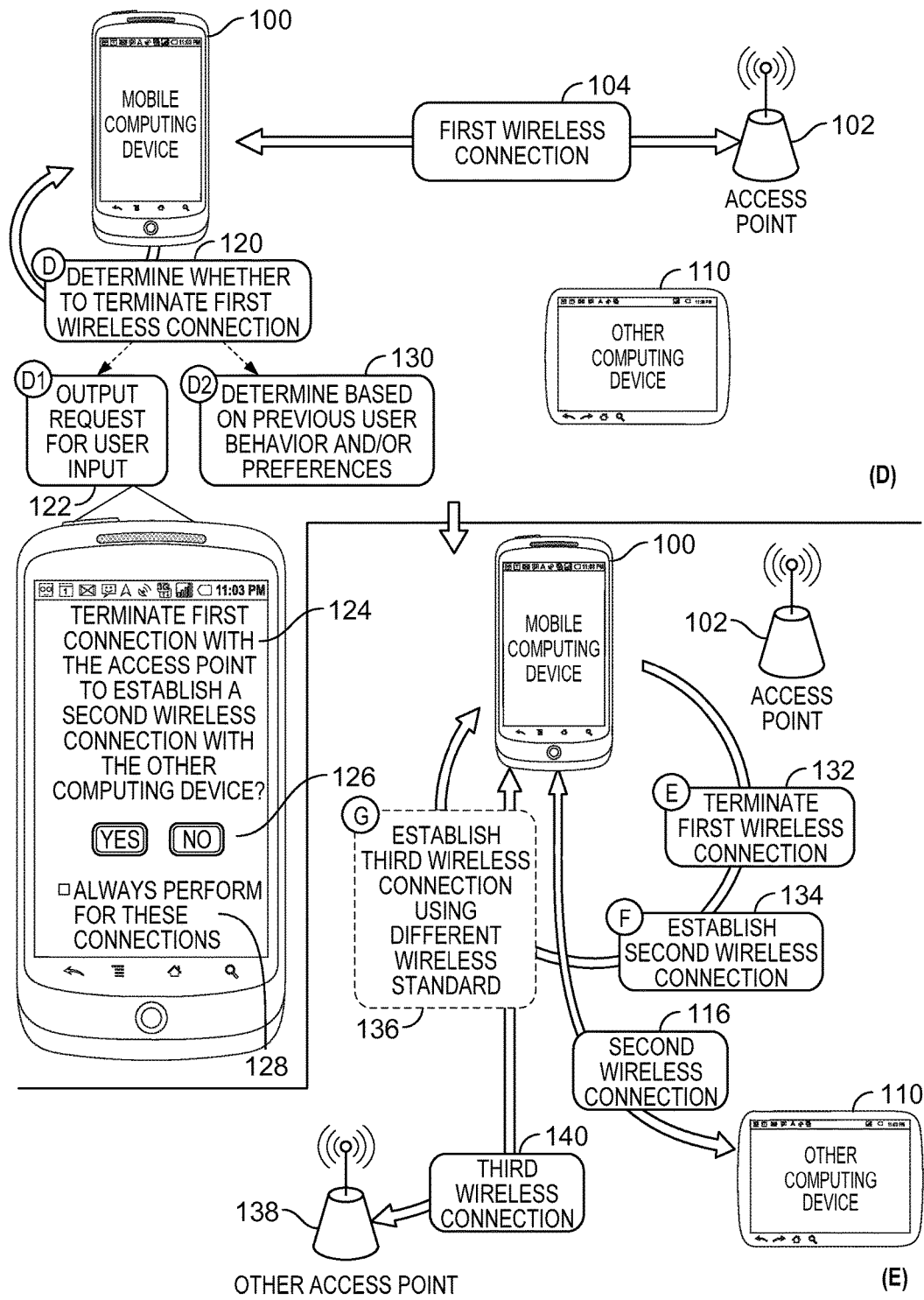
Figure 1C:
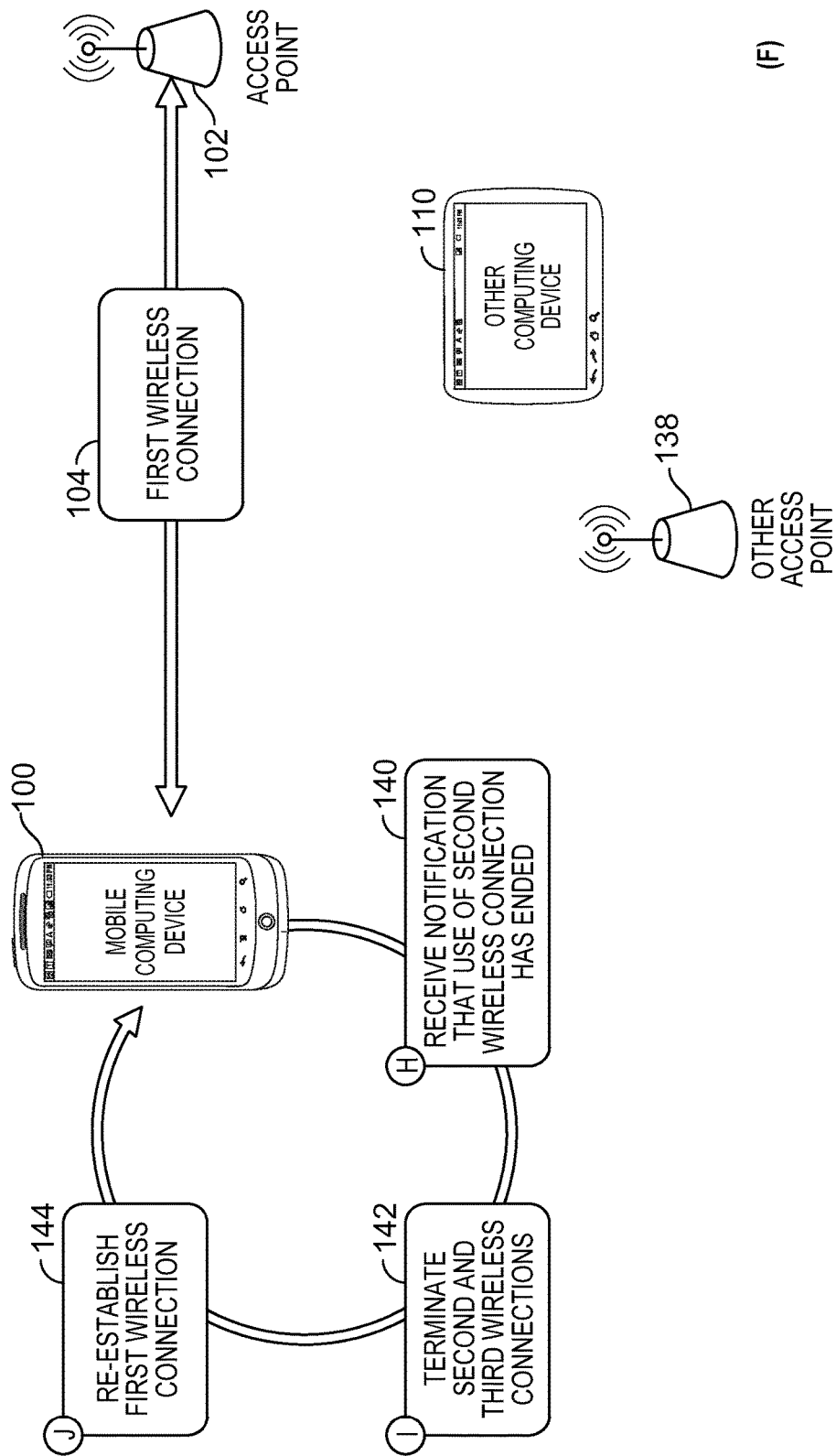

FIGS. 1A-C are conceptual diagrams of a mobile computing device 100 that determines whether and how to use multiple wireless connections. The mobile computing device 100 can be any of a variety of appropriate computing devices, such as a smartphone, a tablet computing device, a laptop computer, a netbook, and/or a media player computing device. Although FIGS. 1A-C are described with regard to the mobile computing device 100, the techniques and steps that are described may also be performed by non-mobile computing devices, such as desktop computers.

Referring to diagram A, the mobile computing device 100 is communicating with an access point 102 over a first wireless connection 104. The wireless connection 104 can over any of a variety of appropriate wireless communication standards, such as the 802.11 wireless standard that is used for Wi-Fi connections, one or more near field communication (NFC) standards (e.g., ISO 14443, NFC IP-1, ISO 18092) that are used for NFC wireless connections, and/or one or more mobile data connection standards such as those used for 3G mobile data connections, 4G LTE mobile data connections, and/or 4G WiMAX mobile data connections. The access point 102 can be any of a variety of appropriate wireless access points, such as a Wi-Fi access point, and/or can be another computing device, such as another computing device communicating with the mobile computing device 100 over an NFC connection, Wi-Fi Direct connection, and/or a Wi-Fi Display connection.

As indicated by step A (106) a request to establish a second wireless connection is received at the mobile computing device 100. The request can be received from an external source (e.g., a user of the mobile computing device 100) and/or from an internal source (e.g., an application that is running on the mobile computing device 100). For instance, a second wireless connection 108 may be made available by another computing device 110. The other computing device 110 can be any of a variety of appropriate computing devices, such as a smartphone, a tablet computing device, a wireless network enabled television/display, a media player computing device, a laptop computer, a server system, and/or a desktop computer. In some implementations, the other computing device 110 can be another wireless access point, similar to the access point 102.

In this example, the second wireless connection is requested over the same wireless radio standard that is being used for the first wireless connection 104 and the mobile computing device 100 is not able to carry more than one simultaneous wireless connection across different channels using the wireless radio standard. For example, the mobile computing device 100 may have a wireless chipset (e.g., Wi-Fi chipset) and/or a driver for the wireless chipset for the first and second wireless connections that are not capable of/configured to simultaneously communicating over multiple different frequencies/channels. Thus, the mobile computing device 100 may not be able to use multiple wireless connections, such as the first and second wireless connections, when a frequency conflict exists. A determination of whether the mobile computing device 100 has such a limitation (e.g., not able to operate multiple different wireless connections on different channels using the same chipset) with regard to the wireless radio standard at issue can be made in a variety of ways, such as polling a driver for the wireless radio standard and/or transmitting a request to establish the second wireless connection and receiving a notification that the mobile computing device 100 is not capable of such simultaneous requests.

Referring to diagram B as depicted in FIG. 1A, in response to determining that the mobile computing device 100 is unable to operate the first and second wireless connections simultaneously across different channels, the mobile computing device 100 can identify a channel of the first wireless connection, as indicated by step B (112) and can attempt to negotiate use of the identified channel for the second wireless connection with the other computing device 110, as indicated by step C (114). For example, if the first wireless connection 104 is a Wi-Fi connection over channel 1 (2412 MHz) of the 2.4 GHz spectrum for wireless connections under the IEEE 802.11 standard, the mobile computing device 100 can transmit a request to the other computing device 110 for channel 1 to be used for a Wi-Fi connection (e.g., a Wi-Fi Display connection, a Wi-Fi Direct connection) with the other computing device 110. The mobile computing device 100 can transmit one or more requests to and receive one or more responses from the other computing device 110 as part of the negotiation.

Referring to diagram C as depicted in FIG. 1A, if the channel negotiation between the mobile computing device 100 and the other computing device 110 is successful, the mobile computing device can proceed to establish and use the second wireless connection 116 using the same channel 118 as for the first wireless connection 104, which can continue to be used without termination. For example, if the first wireless connection 104 is a Wi-Fi connection that uses channel 1 of the 2.4 GHz spectrum, the mobile computing device 100 can continue using the first wireless connection 104 without interruption while the second wireless connection 116 (e.g., Wi-Fi connection, Wi-Fi Display connection, Wi-Fi Direct connection) with the other computing device 110 is established using channel 1 by the mobile computing device 100.

Referring to diagram D as depicted in FIG. 1B, if the channel negotiation is between the mobile computing device 100 and the other computing device 110 is unsuccessful (meaning that the other computing device 110 is unable to use the identified channel 118 for the second wireless connection), the mobile computing device 100 can proceed to determine whether to terminate the first wireless connection 104 in order to establish the second wireless connection, as indicated by step D (120). Such a determination can be made in any of a variety of appropriate ways. For example, the mobile computing device 100 can output a request for user input regarding terminating the first wireless connection 104 so as to establish the second wireless connection, as indicated by step D1 (122). For instance, an example message 124 is output on a display (e.g., touchscreen display) of the mobile computing device 100 asking the user whether he/she would like to terminate the first wireless connection 104 so as to establish the second wireless connection with the other computing device. In addition to outputting the example message 124, the mobile computing device 100 can output controls 126 through which the user can provide a response and/or a checkbox 128 with which the user can indicate a standing preference to always terminate a connection with the access point 102 to establish a connection with the other computing device 110 for the present instance and for future instances. The message 124, the controls 126, and the checkbox 128 can be output using the display of the mobile computing device 100, and input can be received for the controls 126 and/or the checkbox 128 through any of a variety of appropriate mechanisms, such as through a touchscreen, a keypad, one or more motion sensors (e.g., accelerometer(s), gyroscope(s)), one or more microphones, or any combination thereof. Other techniques for providing output to the user and for receiving user input can also be used, such as providing audio and/or haptic output, and/or receiving audio and/or haptic input in response. Based on the received input, the mobile computing device 100 can determine whether to terminate the first wireless connection 104 so as to establish the second wireless connection.

In another example, as indicated by step D2 (130) the mobile computing device 100 can make a determination as to whether to terminate the first wireless connection 104 in order to establish the second wireless connection based on previous user behavior with regard to wireless connections with the wireless access point 102 and the other computing device 110, and/or based on previously expressed user preferences, such as the user selecting the checkbox 128. For example, if the user has previously provided input indicating that the mobile computing device 100 should switch from using a wireless connection with the access point 102 to using a wireless connection with the other computing device 110 at least a threshold number of times (e.g., at least 2 times, at least 4 times, at least 10 times) and/or at least a threshold percentage of the time (e.g., at least 80% of the time the user requests the switch), then the mobile computing device 100 can determine that the first connection 104 should be automatically terminated and that the second connection with the other computing device 110 should be automatically established. Similarly, if the user has previously indicated an explicit preference to make such a change between wireless connections, such as by the user having previously selected the checkbox 128, then the mobile computing device 100 can determine that the first wireless connection 104 should be automatically terminated and that the second wireless connection with the other computing device 110 can be automatically established.

Other mechanisms for determining whether the to terminate the first wireless connection 104 so as to establish the second wireless connection (step D 120) can also be used. For example, the mobile computing device 100 may determine whether to terminate the first wireless connection 104 based on whether or not the request 106 to establish a second wireless connection with the other computing device 110 is based on user input. In some implementations, when the request 106 is based on user input (e.g., a user of the mobile computing device 100 requested that a Wi-Fi Display connection be established with the other computing device 110 so as to stream particular audio and/or video files from the mobile computing device 100 for output on the other computing device 110), the mobile computing device 100 can automatically terminate the first wireless connection 104 so as to establish the second wireless connection with the other computing device 110, as indicated by the implicit user preference for the second wireless connection to be established. In another example, the mobile computing device 100 can determine whether to terminate the first wireless connection 104 based on whether the first wireless connection 104 is actively being used to transmit data to and/or received data from the access point 102. In implementations where the first wireless connection 104 is not actively being used (e.g., less than a threshold data transmission rate with the access point 102) by the mobile computing device 100, the mobile computing device 100 can automatically terminate the first wireless connection 104 and can automatically establish the second wireless connection. In such implementations when the mobile computing device 100 is automatically terminating the first wireless connection 104, the mobile computing device 100 can provide notice to the user through a message, similar to the 124, that indicates that the first wireless connection 104 is being terminated to establish the second wireless connection with the other computing device 110.

Referring to diagram E as depicted in FIG. 1B, based on the determination made in step D (120), the mobile computing device 100 can terminate the first wireless connection 104 with the access point 102, as indicated by step E (132), can establish the second wireless connection 116 with the other computing device 110, as indicated by step F (134), and, in some implementations, can establish a third wireless connection 140 with another access point 138 over a different wireless radio standard than the standard used for the first and second connections, as indicated by step G (136). The third connection 140 can be established to supplement at least a portion of the network access that was available through the first wireless connection 104 but which is not available through the second wireless connection 116. For example, if the access point 102 is a Wi-Fi access point that provides the mobile computing device 100 with access to a LAN as well as to the internet, and the second wireless connection 116 is a Wi-Fi Display connection with other computing device 110 that has limited access to the other computing device 110 and that does not provide access to either the LAN or the internet, the mobile computing device 100 can seek out an alternative connection to provide access to the LAN and/or to the internet. In such an example, the mobile computing device 100 can identify a third wireless connection that can supplement at least a portion of the network access that is lost by terminating the first wireless connection 104 and establishing the second wireless network connection 116, such as establishing a mobile data connection (e.g., 3G connection, 4G LTE connection, 4G WiMAX connection) that can provide internet access to the mobile computing device 100. For instance, the other access point 138 can be a mobile data network access point (e.g., a 3G wireless network tower) and the third wireless connection 140 can be a mobile data network connection.

Although depicted in this example as being another access point, the access point 138 can be any of a variety of network connection providers, such as other computing devices, mobile hotspots, and/or wired network connections.

Referring to diagram F as depicted in FIG. 1C, the mobile computing device 100 can receive a notification that the use of the second wireless connection 116 has ended (e.g., a data transmission session over the second wireless connection 116 has ended), as indicated by step H (140). For example, if the second wireless connection 110 is a Wi-Fi Display connection, the mobile computing device 100 may register one or more events to be monitored that, when they occur, indicate that a data transmission session between the mobile computing device 100 and the other computing device 110 has ended (e.g., the mobile computing device 100 has completed transmitting one or more audio and/or video files/steams to the other computing device 110). When such a session ends, the mobile computing device 100 can receive a notice that the session has ended. In another example, the mobile computing device 100 may request that data traffic over the second wireless connection 116 be monitored, such as at one or more host and/or media layers, and that when the data traffic falls below a threshold level (e.g., less than 1 Kb/sec) for at least a threshold period of time (e.g., for at least 5 seconds, 10 seconds, 30 seconds), that a notification be generated indicating that use of the second wireless connection 116 has ended. In another example, the mobile computing device 100 can receive user input requesting that the second wireless connection 116 with the other computing device 110 be terminated (e.g., a user can provide input requesting that the mobile computing device 100 stop transmitting audio and/or video data to the other computing device 110 over a Wi-Fi Display connection (example second wireless connection 116)).

In response to receiving the notification that use of the second wireless connection 116 has ended, the mobile computing device 100 can automatically terminate the second and/or third wireless connections, as indicated by step I (142), and can proceed to automatically re-establish the first wireless connection 104 with the access point 102, as indicated by step J (144). By automatically terminating the second wireless connection 116 and/or the third wireless connection 140, and re-establishing the first wireless connection 104 without explicit direction from a user and without further user input requesting such action, the mobile computing device 100 can seamlessly transition network connections for the mobile computing device 100 back to their previous state before the request 106 was received.

Figure 2:
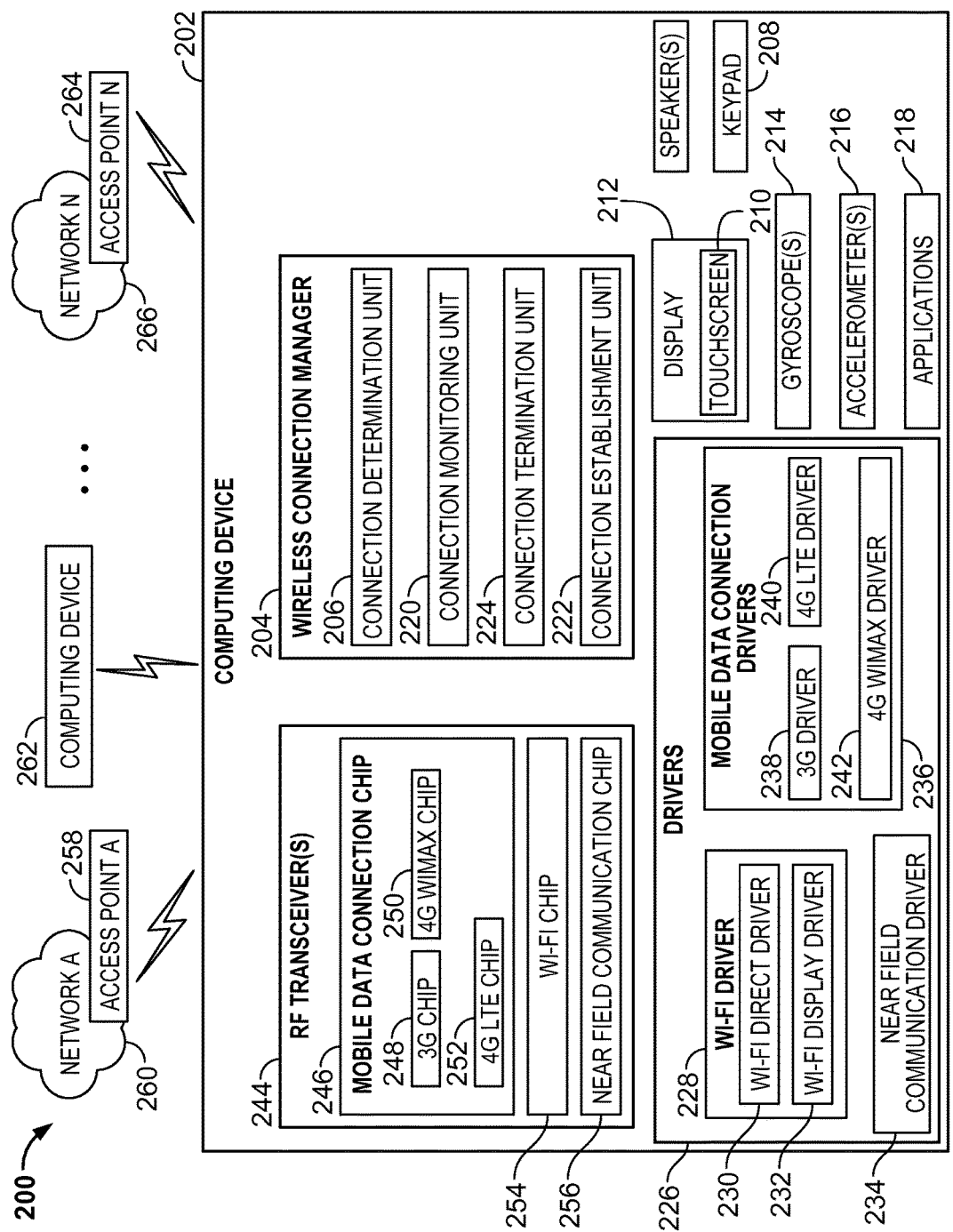
FIG. 2 depicts an example system for using multiple wireless connections on a computing device.

FIG. 2 depicts an example system 200 for using multiple wireless connections on a computing device 202. The computing device 202 can be any of a variety of appropriate computing devices, such as a smartphone, a tablet computing device, a laptop, a netbook, a desktop computer, and/or a media player computing device. The computing device 202 can be similar to the computing device 100 described above with regard to FIGS. 1A-C.

The computing device 202 includes a wireless connection manager 204 that can manage wireless connections for the computing device 202 and that can cause the operations described above with regard to the computing device 100 to be performed. The wireless connection manager 204 can receive requests to establish a second wireless connection and can provide the requests to a connection determination unit 206 that can determine whether the requested connection should be established and, if so, whether other connections should be terminated and/or established. For instance, requests can user directed and can be received through user input, such as input received through a physical keypad 208, a touchscreen 210 that is part of the display 212, and/or though motion based input devices like gyroscopes 214 and/or accelerometers 216. For instance, a user of the computing device 202 may select another computing device from a plurality of available computing devices with which to establish a second wireless connection using the keypad 208, the touchscreen 210, and/or the motion based input devices (e.g., gyroscopes 214, accelerometers 216). In another example, requests to establish a second wireless connection can be received from one or more applications 218 that are running on the computing device 202. The determination made by the connection determination unit 206 can be similar to the steps B-D described above with regard to the mobile computing device 100 and FIGS. 1A-B.

The wireless connection manager 204 can also include a connection monitoring unit 220 to monitor the status of wireless connections and their use by the applications 218. For example, the monitoring unit 220 can monitor for use wireless connections that were established by terminating other wireless connections. The wireless connection manager 204 can also include a connection establishment unit 222 that can establish wireless connections and a connection termination unit 224 that can terminate wireless connections. The connection establishment and termination units 222, 224 can instruct various device drivers 226 to establish and terminate wireless connections. For example, the device drivers 226 can include Wi-Fi drivers 228, Wi-Fi Direct drivers 230, Wi-Fi Display drivers 232, NFC drivers 234, and mobile data connection drivers 236, such as 3G drivers 238, 4G LTE drivers 240, and 4G WiMAX drivers 242. The drivers 226 can interface with one or more radio frequency (RF) transceivers 244 that are configured to wirelessly transmit and receive data according to particular wireless radio standards, such as the 802.11 wireless radio standard for Wi-Fi transmissions. Example RF transceivers 244 include mobile data connection chipsets 246, such as a 3G chipset 248, a 4G WiMAX chipset 250, and/or a 4G LTE chipset 252, a Wi-Fi chipset 254, and/or an NFC chipset 256. The RF transceivers 244 can include other chipsets and the drivers 226 can include other corresponding drivers.

The RF transceivers 244 can transmit and receive wireless signals to one or more other computing devices, such as wireless access point A 258 that provides access to network A 260, computing device 262, and/or access point N 264 that provides access to network N 266. The networks A 260 and N 266 can be any of a variety of networks through which computing devices can communicate, such as a LAN, a wide area network (WAN), a wireless network, a wired network, a fiber optic network, the internet, or any combination thereof. The computing device 262 can be similar to the other computing device 110 as described above with regard to FIGS. 1A-C. The access points A 258 and N 264 can be similar to the access points 102 and 138 described above with regard to FIGS. 1A-C.

Figure 3:
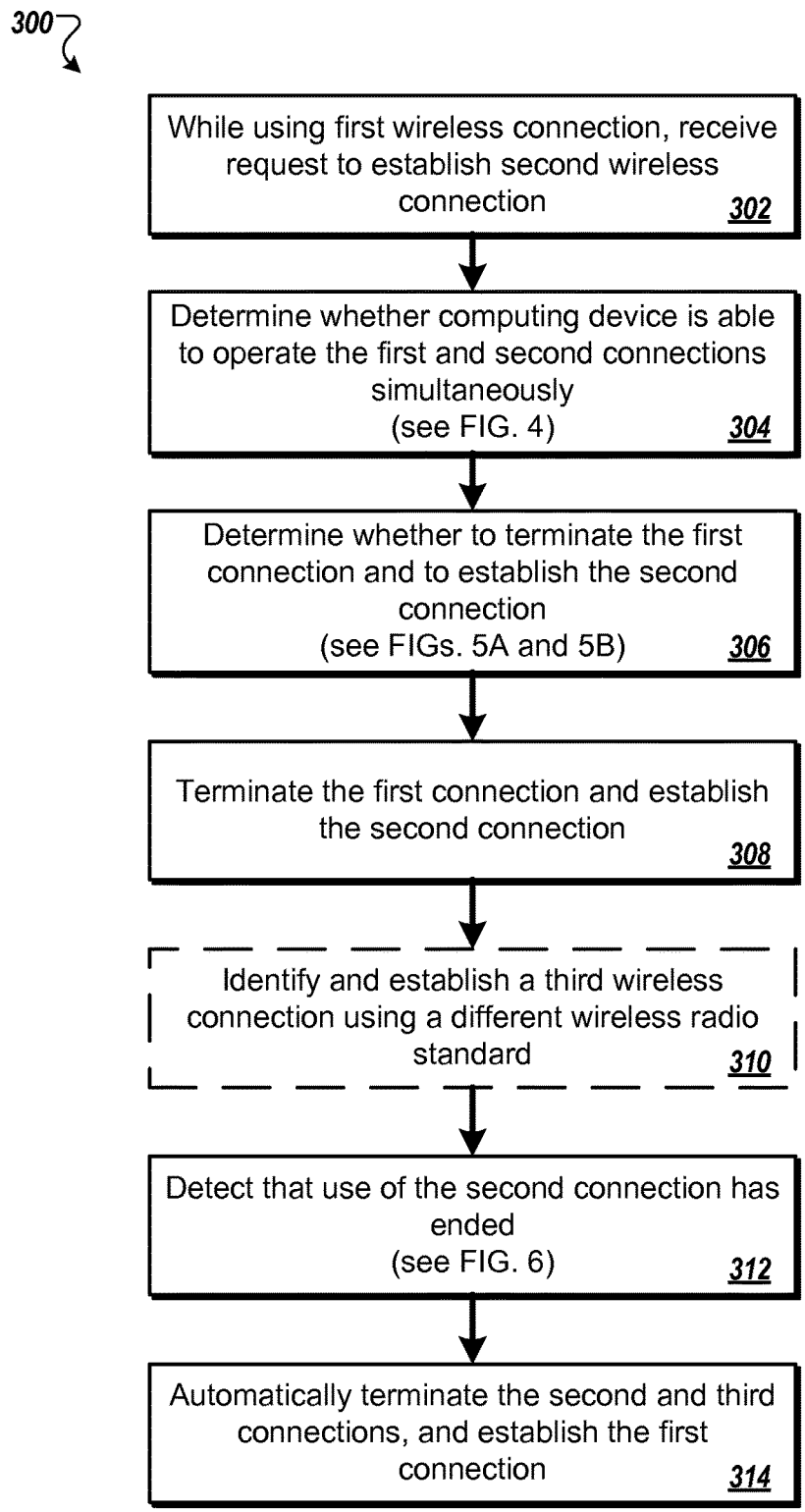
FIG. 3 is a flowchart of an example technique for using multiple wireless connections on a computing device.

FIG. 3 is a flowchart of an example technique 300 for using multiple wireless connections on a computing device. The example technique 300 can be performed by any of a variety of appropriate computing devices, such as the mobile computing device 100 and/or the computing device 202.

While using a first wireless connection, a request to establish a second wireless connection can be received (302). The second wireless connection and the first wireless connection can use the same wireless radio standard, such as the 802.11 standard for Wi-Fi connections. For example, while connected to the access point 102 through the first wireless connection 104, the mobile computing device 100 can receive the request to establish the second wireless connection in step A (106), as depicted in FIG. 1A.

A determination of whether the first and second wireless connections are able to be used simultaneously can be made (304). For example, the connection determination unit 206 can determine whether the computing device 202 is able to simultaneously use a first wireless connection with the access point 258 and a second wireless connection with the computing device 262. In another example, the mobile computing device 100 can determine whether simultaneous wireless connections with the access point 102 and the other computing device 110 are possible based on channel identification, as indicated by step B (112), and channel negotiations with the other computing device 110 and/or the access point 102, as indicated by step C (114) in FIG. 1A. An example technique for making such a determination is described with regard to FIG. 4.

A determination as to whether to terminate the first connection and to establish the second connection is made (306). For example, the connection determination unit 206 can determine whether to terminate a first wireless connection with the access point 258 and to establish a second wireless connection with the computing device 262. In another example, the mobile computing device 100 can determine whether to terminate the first wireless connection 104, as indicated by step D (120). The mobile computing device 100 can make such a determination based on a variety of factors, such as user input (step D1 (122)), previous user behavior, and/or previously identified user preferences (step D2 (130)). Example techniques for making such a determination are described below with regard to FIGS. 5A-B.

The first wireless connection is terminated and the second wireless connection is established (308). For example, the connection termination unit 224 can terminate a first wireless connection with the access point 258 and the connection establishment unit 222 can establish a second wireless connection with the computing device 262. In another example, the mobile computing device 100 can terminate the first wireless connection 104, as indicated by step E (132), and can establish the second wireless connection 116, as indicated by step F (134).

In some implementations, a third wireless connection is identified and established using a different wireless radio standard (310). For example, the connection establishment unit 222 can establish a third wireless connection with the access point 264. In another example, the mobile computing device 100 can establish the third wireless connection 140 with the other access point 138, as indicated by step G (136).

An end of the use of the second wireless connection can be detected (312). For example, the connection monitoring unit 2220 of the wireless connection manager 204 can detect an end of use of a second wireless connection with the computing device 262. In another example, the mobile computing device 100 can receive notification that use of the second wireless connection has ended, as indicated by step H (140). An example technique for making such detection is described below with regard to FIG. 6.

In response to detecting that the second wireless connection has ended, the second and third wireless connections can be terminated, and the first connection can be re-established (314). For example, the connection monitoring unit 220 can direct the connection termination unit 224 to terminate a second wireless connection with the computing device 262 and a third wireless connection with the access point 264, and can direct connection establishment unit 222 can re-establish a first wireless connection with the computing device 258. In another example, the mobile computing device 100 can terminate the second and third wireless connections, as indicated by step I (142), and can re-establish the first wireless connection 104, as indicated by step J (144).

In some implementations, the first wireless connection is a Wi-Fi connection with a Wi-Fi access point, the second wireless connection is a Wi-Fi Display or Wi-Fi Direct connection with another computing device, and the third wireless connection is a mobile data connection over a mobile data network (e.g., 3G wireless network, 4G TLE network, 4G WiMAX network). Other implementations are also possible.

Figure 4:
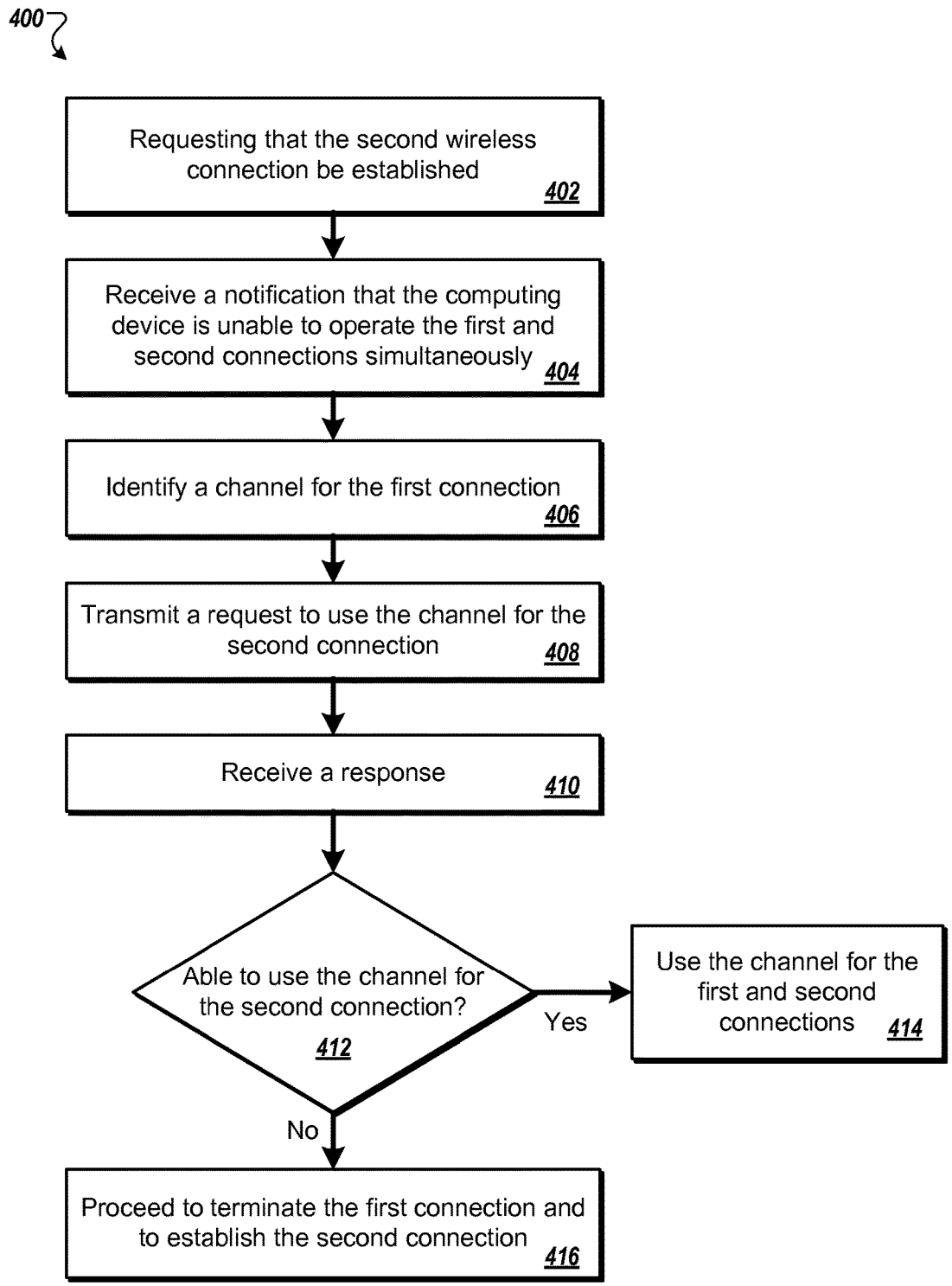
FIG. 4 is a flowchart of an example technique for determining whether more than one wireless connection can operate simultaneously on a computing device.

FIG. 4 is a flowchart of an example technique 400 for determining whether more than one wireless connection can operate simultaneously on a computing device. The example technique 400 can be performed by any of a variety of appropriate computing devices, such as the mobile computing device 100 and/or the computing device 202. Some or all of the example technique 400 can be performed as part of one or more other techniques, such as being performed at step 304 of the example technique 300 described above with regard to FIG. 3.

While using a first wireless connection, a request that a second wireless connection be established can be provided (402). For instance, the request can be provided to an appropriate driver for the second wireless connection. For example, the connection establishment unit 222 of the computing device 202 can provide a request to one or more of the drivers 226 to establish a second wireless connection, for example, with the access point 258 or the computing device 262.

A notification can be received indicating that the computing device is unable to operate the first and second wireless connections simultaneously (404). For example, the connection establishment unit 222 can receive a notification, such as one or more error codes, from one or more of the drivers 226 indicating that the requested wireless connection cannot be established simultaneously with a first wireless connection.

In response to receiving the notification, a channel that is being used for the first wireless connection can be identified (406) and a request to use the identified channel for the second wireless connection can be transmitted to another entity (e.g., access point, other computing device) that would be on the other end of the second wireless connection (408). Such a request can be part of a channel negotiation. For example, the mobile computing device identifies a channel of the first wireless connection 104, as indicated by step B (112), and negotiates use of the identified channel with the other computing device 110, as indicated by step C (114). In another example, the connection determination unit 206 identifies a channel for a current wireless connection and provides a request to use the identified channel to a wireless node (e.g., the access point 258, the computing device 262) through which a second wireless connection could be established.

A response can be received (410) and a determination can be made as to whether the second wireless connection can use the same channel as the first wireless connection (412). If the first and second wireless connections are able to operate on the same channel, then the channel can be used for both connections and the computing device can proceed with operating the first and second wireless connections simultaneously (414). If the first and second wireless connections are unable to be operated on the same channel, then the computing device can proceed to terminate the first wireless connection and to establish the second wireless connection (416). For example, the mobile computing device 100 can receive a response from the other computing device 110 as part of the channel negotiation, as indicated by step C (114), and, based on the response, the mobile computing device 100 can establish the second wireless connection using the identified channel, as indicated in diagram C of FIG. 1A, or can proceed to temporarily terminate the first wireless connection 104, establish the second wireless connection 116, and, in some implementations, establish the third wireless connection 140 as at least a partial substitute for the first wireless connection 104, as indicated by step D (120) through step J (144), as depicted in FIGS. 1B-1C.

In some implementations, the first wireless connection is a Wi-Fi connection with a Wi-Fi access point, the second wireless connection is a Wi-Fi Display or Wi-Fi Direct connection with another computing device, and the third wireless connection is a mobile data connection over a mobile data network (e.g., 3G wireless network, 4G TLE network, 4G WiMAX network). Other implementations are also possible.

Figure 5A:
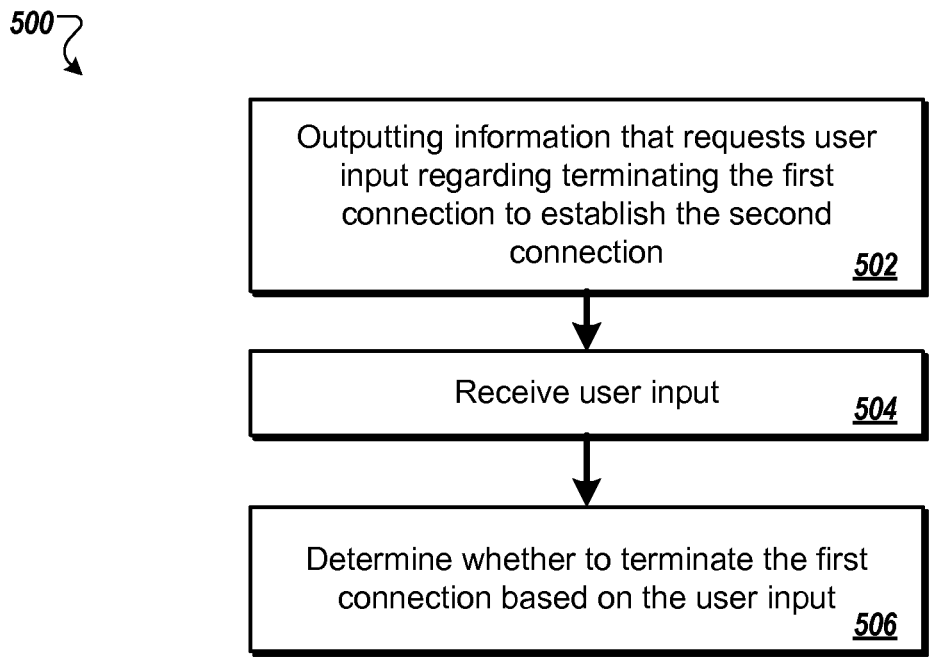
FIGS. 5A-B are flowcharts of example techniques for determining whether to terminate the first connection and to establish the second connection.
Figure 5B:
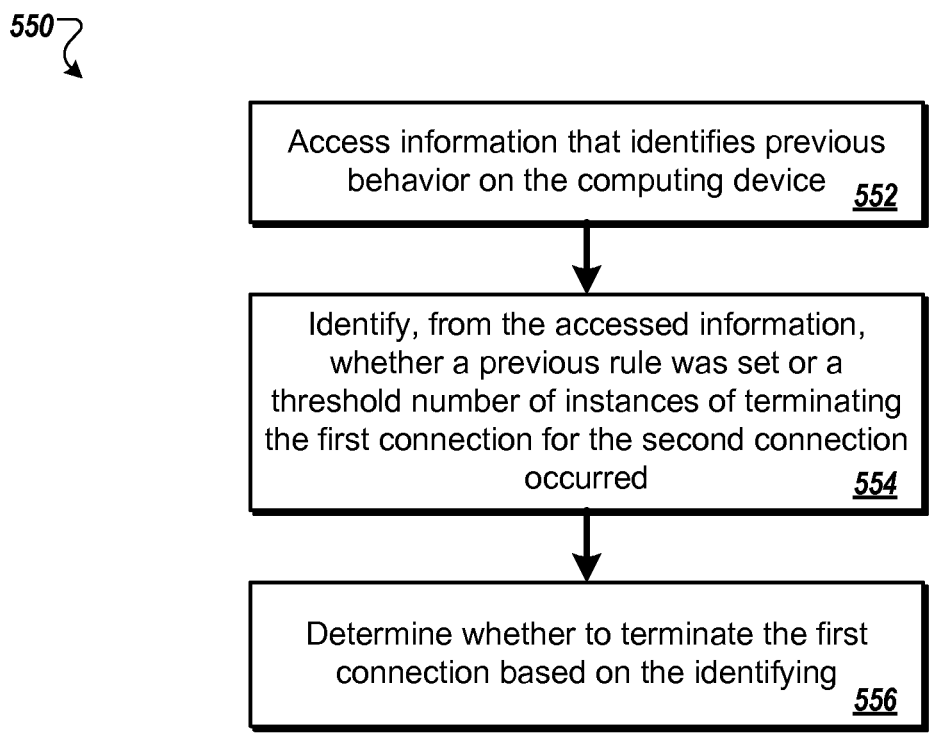

FIGS. 5A-B are flowcharts of example techniques 500 and 550 for determining whether to terminate the first connection and to establish the second connection. The example techniques 500 and 550 can be performed by any of a variety of appropriate computing devices, such as the mobile computing device 100 and/or the computing device 202. Some or all of the example technique 500 and/or the example technique 550 can be performed as part of one or more other techniques, such as being performed at step 306 of the example technique 300 described above with regard to FIG. 3.

Referring to FIG. 5A, in response to determining that a first connection will need to be terminated in order to establish a second wireless connection, information can be output that requests user input regarding terminating the first wireless connection in order to establish the second wireless connection (502). For example, the mobile computing device 100 can output (e.g., display, audibly output, haptic output) the message 124 which prompts the user for input regarding termination of the first wireless connection 104 in order to establish the second wireless connection 116. As described above with regard to FIG. 1B, the message 124 can be output with controls 126 and the checkbox 128 through which user input can be received by the mobile computing device 100. Other types of output and input mechanisms can also be used, such as a speaker to audibly prompt the user for input and a microphone through which input can be received.

User input can be received in response (504) and, based on the user input, a determination can be made as to whether to terminate the first wireless connection and to establish the second wireless connection (506). For example, the mobile computing device 100 can receive input from a user through the controls 126 and/or the checkbox 128, and, based on the input, can determine whether to proceed with using the first wireless connection 104 or to terminate the first wireless connection 104 so as to establish the second wireless connection 116, as indicated by steps D-F (120, 122, 132, 134).

In some implementations, the first wireless connection is a Wi-Fi connection with a Wi-Fi access point, the second wireless connection is a Wi-Fi Display or Wi-Fi Direct connection with another computing device, and the third wireless connection is a mobile data connection over a mobile data network (e.g., 3G wireless network, 4G TLE network, 4G WiMAX network). Other implementations are also possible.

Referring to FIG. 5B, in response to determining that a first connection will need to be terminated in order to establish a second wireless connection, information can be accessed that identifies previous user behavior on the computing device with regard to the first and second wireless connections (552). For example, the mobile computing device 100 can determine whether to terminate the first wireless connection 104 based on previous user behavior and/or previously expressed user preferences, as indicated by step D2 (130).

An identification can be made as to whether either a rule was set regarding termination of the first connection in order to establish the second connection, or at least a threshold number of instances of the user instructing the computing device to terminate the first connection in order to establish the second wireless connection have been performed (554). In response to the identifying, a determination can be made as to whether to terminate the first connection and to establish the second wireless connection (556). For example, the mobile computing device 100 can determine whether to terminate the first wireless connection 104 to establish the second wireless connection 116, as indicated by step D (120).

In some implementations, the first wireless connection is a Wi-Fi connection with a Wi-Fi access point, the second wireless connection is a Wi-Fi Display or Wi-Fi Direct connection with another computing device, and the third wireless connection is a mobile data connection over a mobile data network (e.g., 3G wireless network, 4G TLE network, 4G WiMAX network). Other implementations are also possible.

Figure 6:
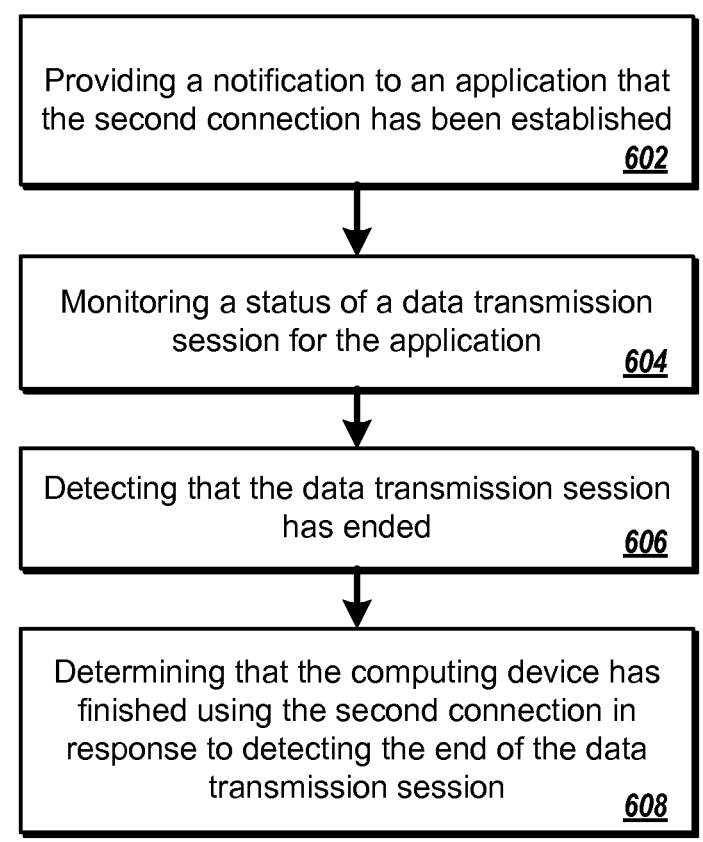
FIG. 6 is a flowchart of an example technique for detecting when use of a wireless connection has ended.

FIG. 6 is a flowchart of an example technique 600 for detecting when use of a wireless connection has ended. The example technique 600 can be performed by any of a variety of appropriate computing devices, such as the mobile computing device 100 and/or the computing device 202. Some or all of the example technique 600 can be performed as part of one or more other techniques, such as being performed at step 312 of the example technique 300 described above with regard to FIG. 3.

In response to terminating a first wireless connection and establishing a second wireless connection, a notification can be provided to an application that requested that the second wireless connection be established (602). Such an application can establish a data connection session using the second wireless connection. For example, one or more of the applications 218 can receive a notification that a wireless connection has been established. Accordingly, the one or more applications 218 can initiate a transmission session over the wireless connection, such as through instantiating a network socket for the wireless connection.

The status of the data transmission session can be monitored (604). For example, one or more events can be registered that request notification when the data transmission session ends or goes idle for at least a threshold period of time. For instance, the connection monitoring unit 220 can register one or more events related to a network socket that is instantiated by one or more of the applications 218.

In response to detecting that the data transmission session has ended (606), a determination can be made that the computing device has finished using the second wireless connection (608). For example, the connection monitoring unit 220 can receive an event notification related to the end of a data transmission session initiated by one or more of the applications 218 and, based on receiving the notification, the connection monitoring unit 220 can direct any previously terminated wireless connections, such as the first wireless connection 104, to be re-established.

In some implementations, the first wireless connection is a Wi-Fi connection with a Wi-Fi access point, the second wireless connection is a Wi-Fi Display or Wi-Fi Direct connection with another computing device, and the third wireless connection is a mobile data connection over a mobile data network (e.g., 3G wireless network, 4G TLE network, 4G WiMAX network). Other implementations are also possible.

Figure 7:
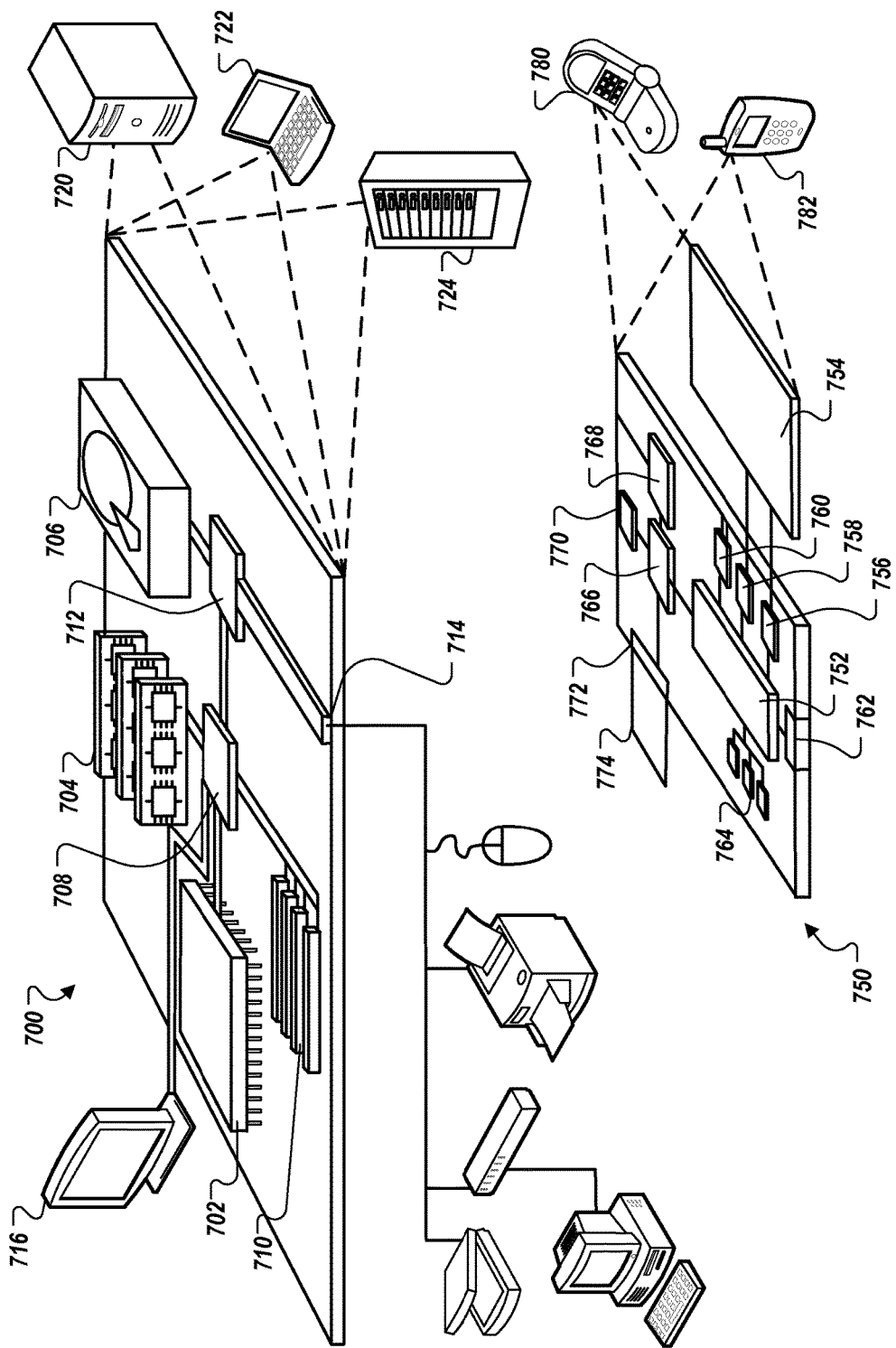
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipsetset of chipsets that include separate and multiple analog and digital processors. Additionally, the processor may be implemented using any of a number of architectures. For example, the processor 710 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Figure 8:
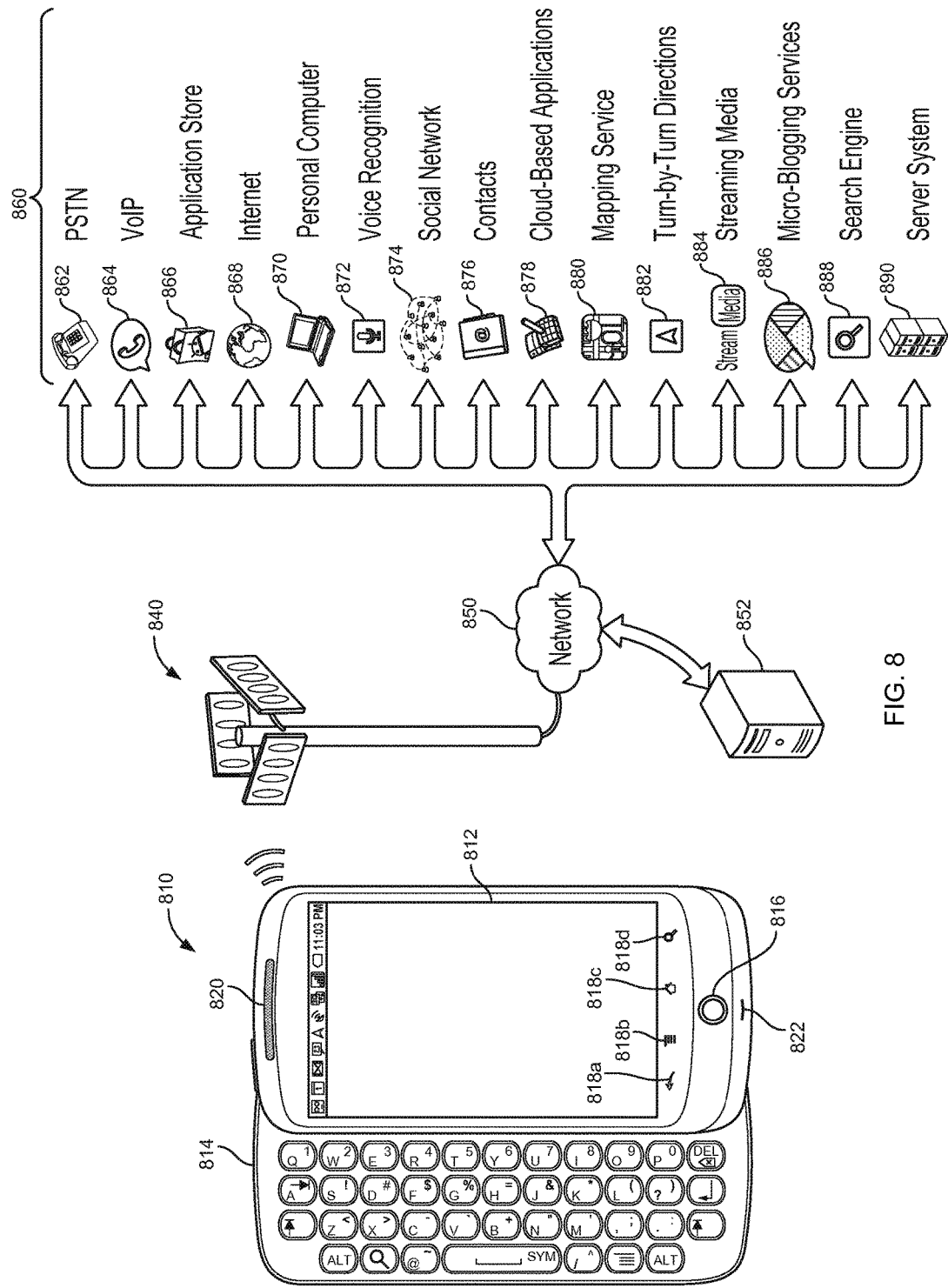
FIG. 8 is a conceptual diagram of a system that may be used to implement the systems and methods described in this document.

Referring now to FIG. 8, a conceptual diagram of a system that may be used to implement the systems and methods described in this document is illustrated. Mobile computing device 810 can wirelessly communicate with base station 840, which can provide the mobile computing device wireless access to numerous services 860 through a network 850.

In this illustration, the mobile computing device 810 is depicted as a handheld mobile telephone (e.g., a smartphone or an application telephone) that includes a touchscreen display device 812 for presenting content to a user of the mobile computing device 810. The mobile computing device 810 includes various input devices (e.g., keyboard 814 and touchscreen display device 812) for receiving user-input that influences the operation of the mobile computing device 810. In further implementations, the mobile computing device 810 may be a laptop computer, a tablet computer, a personal digital assistant, an embedded system (e.g., a car navigation system), a desktop computer, or a computerized workstation.

The mobile computing device 810 may include various visual, auditory, and tactile user-output mechanisms. An example visual output mechanism is display device 812, which can visually display video, graphics, images, and text that combine to provide a visible user interface. For example, the display device 812 may be a 3.7 inch AMO-LED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 812). Further, the mobile computing device 810 may include one or more speakers 820 that convert an electrical signal into sound, for example, music, an audible alert, or voice of an individual in a telephone call.

An example mechanism for receiving user-input includes keyboard 814, which may be a full qwerty keyboard or a traditional keypad that includes keys for the digits '0-9', '*', and '#.' The keyboard 814 receives input when a user physically contacts or depresses a keyboard key. User manipulation of a trackball 816 or interaction with a trackpad enables the user to supply directional and rate of rotation information to the mobile computing device 810 (e.g., to manipulate a position of a cursor on the display device 812).

The mobile computing device 810 may be able to determine a position of physical contact with the touchscreen display device 812 (e.g., a position of contact by a finger or a stylus). Using the touchscreen 812, various "virtual" input mechanisms may be produced, where a user interacts with a graphical user interface element depicted on the touchscreen 812 by contacting the graphical user interface element. An example of a "virtual" input mechanism is a "software keyboard," where a keyboard is displayed on the touchscreen and a user selects keys by pressing a region of the touchscreen 812 that corresponds to each key.

The mobile computing device 810 may include mechanical or touch sensitive buttons 818a-d. Additionally, the mobile computing device may include buttons for adjusting volume output by the one or more speakers 820, and a button for turning the mobile computing device on or off. A microphone 822 allows the mobile computing device 810 to convert audible sounds into an electrical signal that may be digitally encoded and stored in computer-readable memory, or transmitted to another computing device. The mobile computing device 810 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 810 may present a graphical user interface with the touchscreen 812. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 804. User-selection of the button may invoke the pre-defined action.

In some examples, the operating system provides a "desktop" user interface that is displayed upon turning on the mobile computing device 810, activating the mobile computing device 810 from a sleep state, upon "unlocking" the mobile computing device 810, or upon receiving user-selection of the "home" button 818c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 810 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 812 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 810 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 810 may include other application modules and hardware. A call handling unit may receive an indication of an incoming telephone call and provide a user capabilities to answer the incoming telephone call. A media player may allow a user to listen to music or play movies that are stored in local memory of the mobile computing device 810. The mobile telephone 810 may include a digital camera sensor, and corresponding image and video capture and editing software. An internet browser may enable the user to view content from a web page by typing in an addresses corresponding to the web page or selecting a link to the web page.

The mobile computing device 810 may include an antenna to wirelessly communicate information with the base station 840. The base station 840 may be one of many base stations in a collection of base stations (e.g., a mobile telephone cellular network) that enables the mobile computing device 810 to maintain communication with a network 850 as the mobile computing device is geographically moved. The computing device 810 may alternatively or additionally communicate with the network 850 through a Wi-Fi router or a wired connection (e.g., Ethernet, USB, or FIREWIRE). The computing device 810 may also wirelessly communicate with other computing devices using BLUETOOTH protocols, or may employ an ad-hoc wireless network.

A service provider that operates the network of base stations may connect the mobile computing device 810 to the network 850 to enable communication between the mobile computing device 810 and other computerized devices that provide services 860. Although the services 860 may be provided over different networks (e.g., the service provider's internal network, the Public Switched Telephone Network, and the Internet), network 850 is illustrated as a single network. The service provider may operate a server system 852 that routes information packets and voice data between the mobile computing device 810 and computing devices associated with the services 860.

The network 850 may connect the mobile computing device 810 to the Public Switched Telephone Network (PSTN) 862 in order to establish voice or fax communication between the mobile computing device 810 and another computing device. For example, the service provider server system 852 may receive an indication from the PSTN 862 of an incoming call for the mobile computing device 810. Conversely, the mobile computing device 810 may send a communication to the service provider server system 852 initiating a telephone call with a telephone number that is associated with a device accessible through the PSTN 862.

The network 850 may connect the mobile computing device 810 with a Voice over Internet Protocol (VoIP) service 864 that routes voice communications over an IP network, as opposed to the PSTN. For example, a user of the mobile computing device 810 may invoke a VoIP application and initiate a call using the program. The service provider server system 852 may forward voice data from the call to a VoIP service, which may route the call over the internet to a corresponding computing device, potentially using the PSTN for a final leg of the connection.

An application store 866 may provide a user of the mobile computing device 810 the ability to browse a list of remotely stored application programs that the user may download over the network 850 and install on the mobile computing device 810. The application store 866 may serve as a repository of applications developed by third-party application developers. An application program that is installed on the mobile computing device 810 may be able to communicate over the network 850 with server systems that are designated for the application program. For example, a VoIP application program may be downloaded from the Application Store 866, enabling the user to communicate with the VoIP service 864.

The mobile computing device 810 may access content on the internet 868 through network 850. For example, a user of the mobile computing device 810 may invoke a web browser application that requests data from remote computing devices that are accessible at designated universal resource locations. In various examples, some of the services 860 are accessible over the internet.

The mobile computing device may communicate with a personal computer 870. For example, the personal computer 870 may be the home computer for a user of the mobile computing device 810. Thus, the user may be able to stream media from his personal computer 870. The user may also view the file structure of his personal computer 870, and transmit selected documents between the computerized devices.

A voice recognition service 872 may receive voice communication data recorded with the mobile computing device's microphone 822, and translate the voice communication into corresponding textual data. In some examples, the translated text is provided to a search engine as a web query, and responsive search engine search results are transmitted to the mobile computing device 810.

The mobile computing device 810 may communicate with a social network 874. The social network may include numerous members, some of which have agreed to be related as acquaintances. Application programs on the mobile computing device 810 may access the social network 874 to retrieve information based on the acquaintances of the user of the mobile computing device. For example, an "address book" application program may retrieve telephone numbers for the user's acquaintances. In various examples, content may be delivered to the mobile computing device 810 based on social network distances from the user to other members. For example, advertisement and news article content may be selected for the user based on a level of interaction with such content by members that are "close" to the user (e.g., members that are "friends" or "friends of friends").

The mobile computing device 810 may access a personal set of contacts 876 through network 850. Each contact may identify an individual and include information about that individual (e.g., a phone number, an email address, and a birthday). Because the set of contacts is hosted remotely to the mobile computing device 810, the user may access and maintain the contacts 876 across several devices as a common set of contacts.

The mobile computing device 810 may access cloud-based application programs 878. Cloud-computing provides application programs (e.g., a word processor or an email program) that are hosted remotely from the mobile computing device 810, and may be accessed by the device 810 using a web browser or a dedicated program. Example cloud-based application programs include GOOGLE DOCS word processor and spreadsheet service, GOOGLE GMAIL webmail service, and PICASA picture manager.

Mapping service 880 can provide the mobile computing device 810 with street maps, route planning information, and satellite images. An example mapping service is GOOGLE MAPS. The mapping service 880 may also receive queries and return location-specific results. For example, the mobile computing device 810 may send an estimated location of the mobile computing device and a user-entered query for "pizza places" to the mapping service 880. The mapping service 880 may return a street map with "markers" superimposed on the map that identify geographical locations of nearby "pizza places."

Turn-by-turn service 882 may provide the mobile computing device 810 with turn-by-turn directions to a user-supplied destination. For example, the turn-by-turn service 882 may stream to device 810 a street-level view of an estimated location of the device, along with data for providing audio commands and superimposing arrows that direct a user of the device 810 to the destination.

Various forms of streaming media 884 may be requested by the mobile computing device 810. For example, computing device 810 may request a stream for a pre-recorded video file, a live television program, or a live radio program. Example services that provide streaming media include YOUTUBE and PANDORA.

A micro-blogging service 886 may receive from the mobile computing device 810 a user-input post that does not identify recipients of the post. The micro-blogging service 886 may disseminate the post to other members of the micro-blogging service 886 that agreed to subscribe to the user.

A search engine 888 may receive user-entered textual or verbal queries from the mobile computing device 810, determine a set of internet-accessible documents that are responsive to the query, and provide to the device 810 information to display a list of search results for the responsive documents. In examples where a verbal query is received, the voice recognition service 872 may translate the received audio into a textual query that is sent to the search engine.

These and other services may be implemented in a server system 890. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

What is claimed is:

1. A computer-implemented method comprising:
   receiving, at a computing device and while the computing device is using a first bidirectional wireless connection, a request to establish a second bidirectional wireless connection using a same wireless radio standard as the first bidirectional wireless connection;
   detecting, by the computing device, that the computing device is able to operate more than one bidirectional wireless connection simultaneously over different frequencies, using the same wireless radio standard;
   based on detecting that the computing device is able to operate more than one bidirectional wireless connection simultaneously over different frequencies using the same wireless radio standard, determining, by the computing device, to continue operating the first bidirectional wireless connection and to establish the second bidirectional wireless connection over different frequencies using the same wireless radio standard;
   based on determining to continue operating the first bidirectional wireless connection and to establish the second bidirectional wireless connection over different frequencies using the same wireless radio standard, establishing, by the computing device, the second bidirectional wireless connection while simultaneously operating the first bidirectional wireless connection;

detecting, by the computing device, that the computing device has finished using the second bidirectional wireless connection that is using the same wireless radio standard as the first bidirectional wireless connection and that is over a different frequency than the first bidirectional wireless; and in response to detecting that the computing device has finished using the second bidirectional wireless connection that is using the same wireless radio standard as the first bidirectional wireless connection and that is over the different frequency than the first bidirectional wireless, automatically terminating, by the computing device, the second bidirectional wireless connection that is using the same wireless radio standard as the first bidirectional wireless connection and that is over the different frequency than the first bidirectional wireless while simultaneously operating the first bidirectional wireless connection.

2. The computer-implemented method of claim 1, wherein:

the first bidirectional wireless connection comprises a Wi-Fi connection with a wireless access point;

the second bidirectional wireless connection comprises a Wi-Fi direct connection with another computing device; and the same wireless radio standard comprises a IEEE 802.11 wireless radio standard.

3. The computer-implemented method of claim 2, wherein the Wi-Fi direct connection comprises a Wi-Fi display connection with the other computing device, the Wi-Fi display connection automatically encoding and transmitting video and audio data from the computing device for presentation by the other computing device.

4. The computer-implemented method of claim 3, wherein the other computing device comprises a television with one or more Wi-Fi chipsets that is configured to establish the Wi-Fi display connection.

5. The computer-implemented method of claim 1, wherein the first bidirectional wireless connection provides access to a first network that is different from a second network to which the second bidirectional wireless connection provides access.

6. The computer-implemented method of claim 5, further comprising:

further based on determining to continue operating the first bidirectional wireless connection and to establish the second bidirectional wireless connection over different frequencies using the same wireless radio standard, establishing a third bidirectional wireless connection to replace the first bidirectional wireless connection, wherein:

the third bidirectional wireless connection uses a different wireless radio standard than the same wireless radio standard of the first and second bidirectional wireless connections, and the third bidirectional wireless connection provides access to at least a portion of the first network that is accessible through the first bidirectional wireless connection; and further in response to detecting that the computing device has finished using the second bidirectional wireless connection, automatically terminating the third bidirectional wireless connection.

7. The computer-implemented method of claim 6, wherein:

the first bidirectional wireless connection comprises a Wi-Fi connection with a wireless access point;

the second bidirectional wireless connection comprises a Wi-Fi direct connection with another computing device; and the third bidirectional wireless connection comprises a mobile data connection through a cellular network.

8. The computer-implemented method of claim 7, wherein:

the cellular network comprises a 3G cellular network, and the different wireless radio standard comprises a 3G wireless standard.

9. The computer-implemented method of claim 7, wherein:

the cellular network comprises a 4G cellular network, and the different wireless radio standard comprises a 4G long term evolution (LTE) wireless standard or a 4G mobile WiMAX standard.

10. The computer-implemented method of claim 1, wherein detecting that the computing device is able to operate more than one bidirectional wireless connection simultaneously over different frequencies, using the same wireless radio standard comprises:

requesting that the second bidirectional wireless connection be established using the same wireless radio standard while the computing device is using the first bidirectional wireless connection; and receiving, in response to requesting that the second bidirectional wireless connection be established using the same wireless radio standard while the computing device is using the first bidirectional wireless connection, a notification that the computing device is able to operate more than one bidirectional wireless connection simultaneously using the same wireless radio standard.

11. The computer-implemented method of claim 10, further comprising:

in response to receiving the notification, identifying a channel for the first bidirectional wireless connection; and transmitting, by the computing device, a request to use a different channel of the first bidirectional wireless connection for the second bidirectional wireless connection;

receiving, at the computing device, a response indicating whether the second bidirectional wireless connection will use the different channel of the first bidirectional wireless connection.

12. The computer-implemented method of claim 11, when the response indicates that the second bidirectional wireless connection will use the different channel of the first bidirectional wireless connection, proceeding with determining to continue operating the first bidirectional wireless connection and to establish the second bidirectional wireless connection over different frequencies using the same wireless standard.

13. The computer-implemented method of claim 11, when the response indicates that the second bidirectional wireless connection will use the different channel of the first bidirectional wireless connection, establishing the second bidirectional wireless connection using the different channel and without terminating the first bidirectional wireless connection.

14. The computer-implemented method of claim 1, wherein the determining comprises:

outputting, by the computing device, information that i) indicates that, to establish the second bidirectional wireless connection, the first bidirectional wireless connection will not have to be terminated, and ii) requests user input indicating whether the user wants to terminate the first bidirectional wireless connection to establish the second bidirectional wireless connection.

15. The computer-implemented method of claim 1, wherein the determining comprises:
   accessing, by the computing device, information that identifies previous behavior on the computing device with regard to establishing and terminating the first bidirectional wireless connection and the second bidirectional wireless connection;
   identifying, based on the accessed information, whether i) a user of the computing device previously set a rule for the computing device to automatically terminate the first bidirectional wireless connection to establish the second bidirectional wireless connection, or ii) the user of the computing device has previously instructed the computing device at least a threshold number of times to terminated the first bidirectional wireless connection to establish the second bidirectional wireless connection; and
   based on the identifying, determining to continue operating the first bidirectional wireless connection and to establish the second bidirectional wireless connection over different frequencies using the same wireless standard.

16. The computer-implemented method of claim 1, wherein the request to establish the second bidirectional wireless connection is received from an application that is running on the computing device;
   wherein detecting that the computing device has finished using the second bidirectional wireless connection comprises:
      after establishing the second bidirectional wireless connection, providing a notification to the application that the second bidirectional wireless connection has been established, wherein the application initiates a data transfer session using the second bidirectional wireless connection;
      monitoring a status of the data transfer session for the application;
      detecting that the data transfer session has ended;
      in response to detecting that the data transfer session has ended, determining that the computing device has finished using the second bidirectional wireless connection.

17. A computing device comprising:
   a computer processor;
   a wireless chipset to communicate with other computing devices using a wireless radio standard;
   a driver for the wireless chipset that is programmed to i) cause the wireless chipset to transmit and receive communication according to the wireless radio standard, and ii) provide indications that the wireless chipset is able to operate more than one bidirectional wireless connection simultaneously using the wireless radio standard; and
   a wireless connection manager that is programmed to i) determine to continue operating a first bidirectional wireless connection in response to receiving a request to establish a second bidirectional wireless connection, the first bidirectional wireless connection and the second bidirectional wireless connection using the wireless chipset and the wireless radio standard over different frequencies, ii) establish the second bidirectional wireless connection while simultaneously operating the first bidirectional wireless connection based on determining to continue operating the first bidirectional wireless connection in response to receiving the request to establish a second bidirectional wireless connection, and iii) in response to detecting that the second bidirectional wireless connection is finished being used, automatically terminate the second bidirectional wireless connection that is using the same wireless radio standard as the first bidirectional wireless connection and that is over the different frequency than the first bidirectional wireless while simultaneously operating the first bidirectional wireless connection.

18. The computing device of claim 17, wherein:
   the first bidirectional wireless connection comprises a Wi-Fi connection with a wireless access point;
   the second bidirectional wireless connection comprises a Wi-Fi direct connection with another computing device; and
   the wireless radio standard comprises a IEEE 802.11 wireless radio standard.

19. The computing device of claim 18, wherein the Wi-Fi direct connection comprises a Wi-Fi display connection with the other computing device, the Wi-Fi display connection automatically encoding and transmitting video and audio data from the computing device for presentation by the other computing device.

20. A computer program product stored on a computer-readable storage device including instructions that, when executed, cause one or more computer processors of a computing device to perform operations comprising:
   receiving, at a computing device and while the computing device is using a first bidirectional wireless connection, a request to establish a second bidirectional wireless connection using a same wireless radio standard as the first bidirectional wireless connection;
   detecting, by the computing device, that the computing device is able to operate more than one bidirectional wireless connection simultaneously over different frequencies, using the same wireless radio standard;
   based on detecting that the computing device is able to operate more than one bidirectional wireless connection simultaneously over different frequencies using the same wireless radio standard, determining, by the computing device, to continue operating the first bidirectional wireless connection and to establish the second bidirectional wireless connection over different frequencies using the same wireless radio standard;
   based on determining to continue operating the first bidirectional wireless connection and to establish the second bidirectional wireless connection over different frequencies using the same wireless radio standard, establishing, by the computing device, the second bidirectional wireless connection while simultaneously operating the first bidirectional wireless connection;
   detecting, by the computing device, that the computing device has finished using the second bidirectional wireless connection that is using the same wireless radio standard as the first bidirectional wireless connection and that is over a different frequency than the first bidirectional wireless; and
   in response to detecting that the computing device has finished using the second bidirectional wireless connection that is using the same wireless radio standard as the first bidirectional wireless connection and that is over the different frequency than the first bidirectional wireless, automatically terminating, by the computing device, the second bidirectional wireless connection that is using the same wireless radio standard as the first bidirectional wireless connection and that is over the different frequency than the first bidirectional wireless while simultaneously operating the first bidirectional wireless connection.

\* \* \* \* \*